United States Patent
Bishop

(10) Patent No.: US 8,128,241 B2
(45) Date of Patent: Mar. 6, 2012

(54) SHORT-THROW PROJECTOR MOUNTING SYSTEM

(75) Inventor: Les Bishop, Chelmsford, MA (US)

(73) Assignee: Leslie C. Bishop, N. Chelmsford, MA (US)

( * ) Notice: Subject to any disclaimer, the term of this patent is extended or adjusted under 35 U.S.C. 154(b) by 0 days.

(21) Appl. No.: 12/907,335

(22) Filed: Oct. 19, 2010

(65) Prior Publication Data

US 2011/0089297 A1 Apr. 21, 2011

Related U.S. Application Data

(60) Provisional application No. 61/252,763, filed on Oct. 19, 2009.

(51) Int. Cl.
G03B 21/14 (2006.01)
G03B 21/22 (2006.01)
G03B 17/02 (2006.01)
F16M 11/00 (2006.01)
A47B 96/00 (2006.01)
A47B 81/00 (2006.01)

(52) U.S. Cl. .............. 353/119; 353/122; 248/222.14; 248/231.9; 248/225.11; 248/224.8; 312/10.1; 352/242; 352/243

(58) Field of Classification Search .............. 353/119, 353/122; 248/201, 300, 316.8, 222.14, 231.9, 248/225.11, 224.8; 312/10.1; 352/242, 243; 434/421

See application file for complete search history.

(56) References Cited

U.S. PATENT DOCUMENTS

| 4,588,155 A | 5/1986 | James |
| 6,379,012 B1* | 4/2002 | Enochs et al. ................ 353/79 |
| 6,959,937 B2 | 11/2005 | Schneider et al. |
| 7,029,133 B2* | 4/2006 | Challis ...................... 353/119 |
| 2005/0174539 A1 | 8/2005 | Walker et al. |
| 2005/0191611 A1 | 9/2005 | Owen et al. |
| 2009/0015798 A1 | 1/2009 | Unsworth |
| 2009/0101608 A1 | 4/2009 | Sloat |
| 2009/0159770 A1 | 6/2009 | Sugarman |
| 2010/0045943 A1 | 2/2010 | Gillespie |

OTHER PUBLICATIONS

InteractiveMounts.com, Inc., ProMount SB3-7/TMB3-7 Website Brochure.
InteractiveMounts.com, ProMount Interactive White Board Bracket, Model SB3-7 & Model TMB3-7 Quick Install Guide, 2008.
InteractiveMounts.com, SBG3 Series Website Brochure, 2009.
InteractiveMounts.com, SBG5 Series Website Brochure, 2009.
Tequipment, whiteboardrails.com, Whiteboard Rails Website Brochure.
whitboardrails.com, Fixed Rail Systems for Smart Board interactive whiteboards, RS640 & RS670 Installation Instructions, 2009.

(Continued)

Primary Examiner — Georgia Y Epps
Assistant Examiner — Magda Cruz
(74) Attorney, Agent, or Firm — Chapin IP Law, LLC

(57) ABSTRACT

A short-throw projector and Interactive White Board (IWB) mounting system is presented. The mounting system includes a pair of board mounting brackets, such that a section of the board mounting bracket is positionable a predetermined distance from a mounting surface. The mounting system further includes projector mount bracket wherein a portion of the projector mount bracket is also positionable a predetermined distance from a mounting surface such that a desired distance is maintained between the projector and the IWB when the system is installed over an existing structure.

20 Claims, 4 Drawing Sheets

OTHER PUBLICATIONS whiteboardrails.com, Wall mounting made easy, Website Product Brochure.

whiteboardrails.com, Fixed Whiteboard Rail System Assembly, Website Installation Instructions, Feb. 2008.

Diversimount universal stationary mount solution, Website Brochure.

Numonics, Intelli-Mount OCBM Over ChalkBoard Mount, Website Brochure.

Peerless Industries, Inc., Technical Data Sheet—Custom White Board Wall Mount Models: MIS536, Sheet No. 125-9509-2, Nov. 18, 2009.

InteractiveMounts.com, Inc., ProMount PB3-13, Website Brochure.

InteractiveMounts.com, Inc., ProMount SBG2 3-4, Website Brochure, 2008.

InteractiveMounts.com, ProMount Interactive White Board Bracket, Model SBG2 3-4 (for Smart Board 60012), Quick Install Guide, 2008.

* cited by examiner

SHORT-THROW PROJECTOR MOUNTING SYSTEM

CROSS REFERENCE TO RELATED APPLICATIONS

The present application claims the benefit of U.S. Provisional Patent Application No. 61/252/763, filed on Oct. 19, 2009, which is incorporated herein by reference in its entirety.

BACKGROUND

Various systems for mounting projectors are known, with the projectors being used to display images on a screen or surface. Some such mounting systems provide for mounting or resting the projector on a table or a fixture rising above the floor in front of the screen. Other such systems are configured to suspend the projector from a ceiling in front of the screen. Still other systems mount the projector from a wall adjacent to the screen. With each of the systems, the projector is generally positioned between the user and the screen and between the viewing audience and the screen. Accordingly, the projector may interfere with the ability of at least a portion of the audience to view the projected images on the display screen. Further, light from the projector, which may be intense, may be in the line of sight of the user of the projector, causing discomfort or visual strain. Additionally, when the user stands before the display screen, the projector may cast the user's shadow onto the screen, detracting from the audience's attention or enjoyment of the projected images.

To overcome limitations of using conventional projectors, various short throw projectors and ultra short throw projectors have been developed. These projectors are positioned relatively near to a display screen but still provide a relatively large projected image. When properly mounted, such projectors may mitigate interference effects with the audience, operator discomfort, and shadow effects associated with conventional projectors.

It is common for these projectors to be used in conjunction with an interactive white board (IWB). An IWB is a large interactive display that connects to a computer. A projector projects the computer's desktop onto the board's surface, where users control the computer using a pen, finger or other device. The IWB is typically mounted to a wall. IWBs are used in a variety of settings such as in classrooms at all levels of education, in corporate board rooms and work groups, in training rooms for professional sports coaching, in broadcasting studios and more. IWBs may use one of several types of sensing technology to track interaction on the screen surface: resistive, electromagnetic, infrared optical, laser, ultra-sonic, and camera-based (optical). Interactive whiteboards have some issues similar to regular whiteboards. Permanent markers, for example, can create problems on some interactive whiteboard surfaces. Punctures, dents and other damage to surfaces are a risk, but do not typically occur in the normal course of classroom use.

In these conventional short throw projector mounting systems, an arm having a fixed length extends outwardly from a plate or base which is mounted to a wall surface, typically above the interactive white board which is also mounted to the wall surface. The arm of the short throw projector mounting system has a fixed length which is required, so that the images projected by short throw projector are sharp and focused when viewed on the interactive white board. These conventional short throw projector mounting systems are not adjustable with regard to the distance the short throw projector is from the interactive white board.

SUMMARY

Conventional mechanisms such as those explained above suffer from a variety of deficiencies. One such deficiency is encountered when there is a desire to mount the IWB over an existing chalkboard, whiteboard or other structure. Short-throw projection systems (and ultra short-throw projection systems referred to herein as a short-throw projection system) require the projector to be mounted, usually by way of an arm extending from the same wall surface as the chalkboard or whiteboard, a predetermined distance from the IWB. When the IWB is placed over an existing chalkboard or whiteboard, the IWB extends from the surface of the existing wall anywhere from a few inches up to six inches. Accordingly, the short-throw projector must also be spaced the same distance from the wall surface to function properly, however with conventional short throw projector mounting systems there is not a way to adjust the distance of the short throw projector with respect to the interactive white board to account for the distance the interactive white board extends from the wall surface when the interactive white board is mounted over an existing structure (e.g., a blackboard). Without an adjustment of the distance of the short throw projector a corresponding amount so that the projector is the required distance from the interact white board the images provided by the short throw projector are compromised.

Embodiments of the invention significantly overcome such deficiencies and provide mechanisms and techniques that provide a mounting system for a short-throw projection system and interactive white board which can be installed over an existing wall structure.

In a particular embodiment, the mounting system includes a first projector mount bracket having a first end and a second end, wherein the first end includes a support hole disposed therethrough and wherein the second end includes at least one slot disposed therethrough; an adjustable support capable of extending through the support hole; a second projector mount bracket having a first end and a second end, the second end including a second mounting foot extending therefrom, and a mounting hole disposed in the mounting foot; the second projector mount bracket including a slot disposed therethrough and wherein at least a portion of the slot of the second projector mount bracket is positioned overlapping at least a portion of the slot of the first projector mount bracket; and a second fastener disposed through the slot of the first projector mount bracket and the slot of the second projector mount bracket such that the second end of the first projector mount bracket is positionable along a length of the second projector mount bracket and wherein the first fastener is used to fixate the first projector mount bracket in a desired position along the second projector mount bracket.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
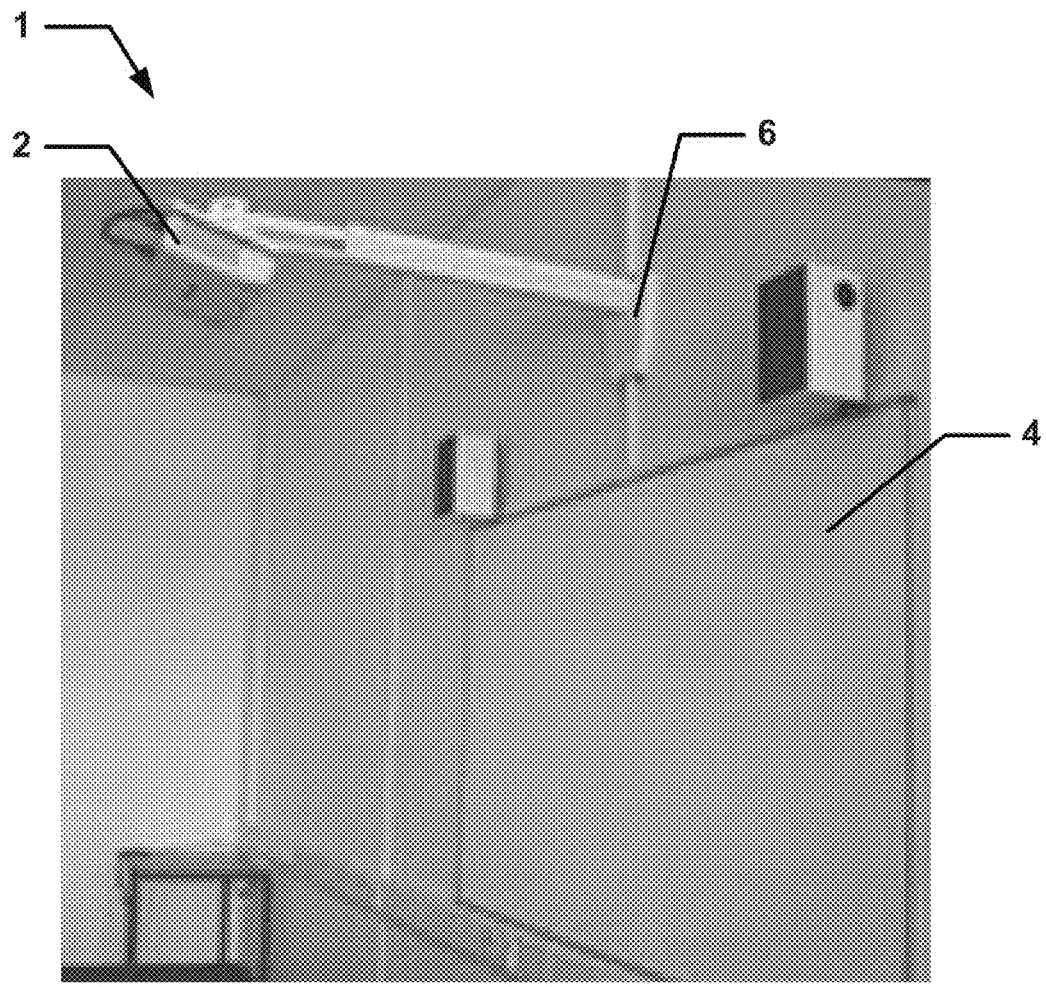
FIG. 1 illustrates a prior art short throw projector and interactive whiteboard mounting system.

Referring now to FIG. 1 a prior art short-throw projector and interactive whiteboard (IWB) system 1 is shown. While the term short-throw projector is used throughout, the term is also meant to include ultra short-throw projectors as well. The system 1 includes a short-throw projector 2 mounted to a wall surface by way of mount 6. Also shown is an interactive white board 4. The short-throw projector is positioned a fixed, pre-determined distance from the white board as shown. In order to properly function, the projector must be maintained at the predetermined distance from the interactive white board. In the case where the interactive white board is installed extending over an exiting chalkboard or similar structure, the pre-determined distance is changed, and as a result the images provided by the short-throw projector will not be properly displayed on the interactive white board.

While the following description refers to a short throw projector mounting system which doesn't require the use of an arm, it should be appreciated that in some embodiments the short throw projector mounting system is mounted to an arm having a predetermined length, wherein one end of the arm is connected to the short throw projector mounting system while the opposite end of the arm is mounted to a structure such as a wall surface.

Figure 2:
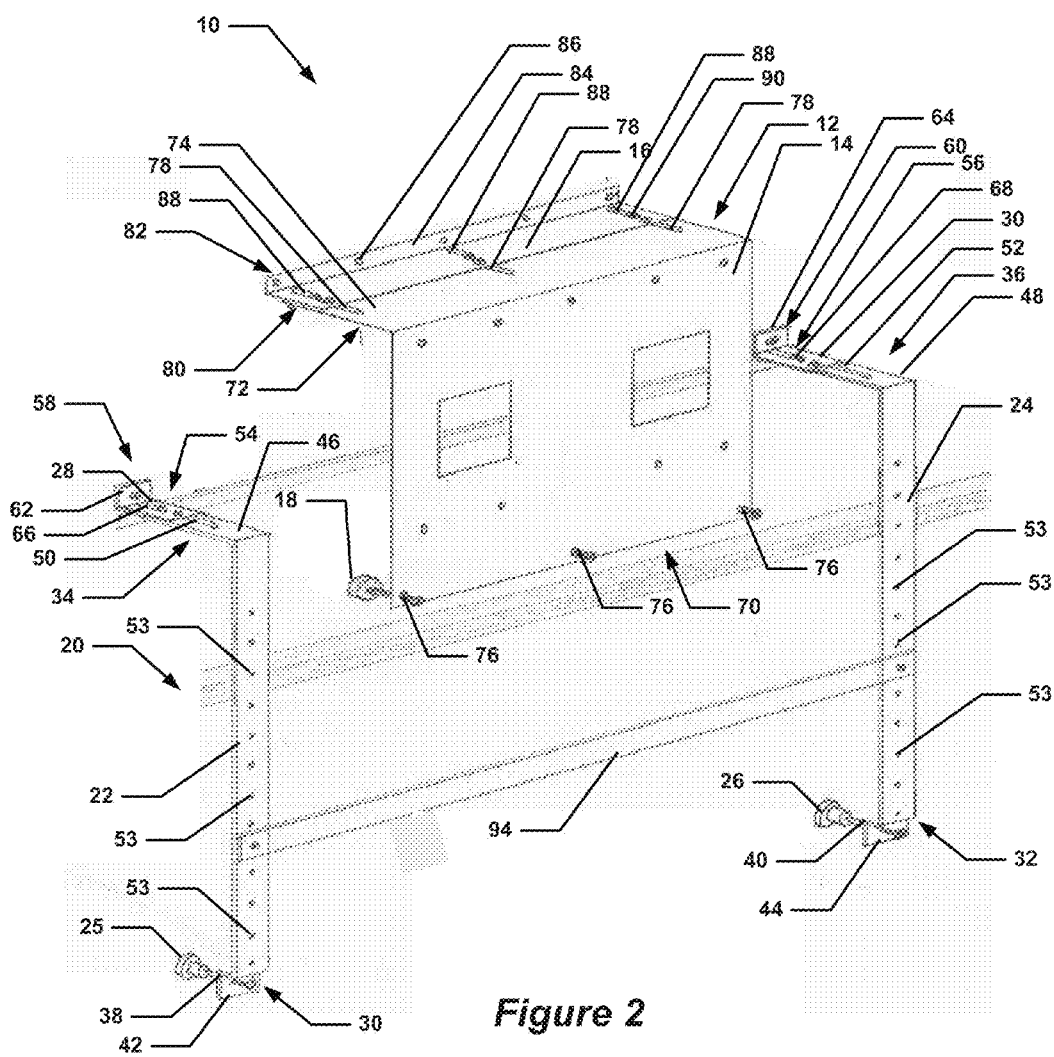
FIG. 2 illustrates an example mounting system for a short-throw projection system and interactive white board in accordance with embodiments of the invention.

Referring now to FIG. 2, a mounting system 10 is shown for accommodating a short-throw projector and interactive white board when the interactive white board is positioned over an existing structure (e.g., chalkboard, whiteboard, window, door, or the like).

The projector mount system 12 includes a first projector mount bracket 14 having a first end 70 and a second end 72 including a leg 74 extending therefrom. The first end 70 includes at least one support hole 76 disposed therethrough. An adjustable support 18 extends through the support hole. The leg 74 extending from the second end 72 includes at least one slot 78 disposed therethrough.

A second projector mount bracket 16 is shown having a first end 80 and a second end 82, the second end 82 including a mounting foot 84 extending therefrom, and a mounting hole 86 disposed in the mounting foot 84. The second projector mount bracket 16 includes one or more slots 82 disposed therethrough and wherein at least a portion of the slots 82 of the second projector mount bracket 16 are positioned overlapping at least a portion of the slots 78 of the first projector mount bracket 14. A second fastener is disposed through the slot of the first projector mount bracket 14 and the slot of the second projector mount bracket 16 such that the second end 72 of the first projector mount bracket 14 is positionable along a length of the second projector mount bracket 16 and wherein the first fastener is used to fixate the first projector mount bracket 14 in a desired position along the second projector mount bracket 16.

In certain applications the projector mount system 10 is used in conjunction with a board mount system 20. The board mount system 20 includes a pair of board mounting bracket assemblies. Each one of the pair of board mounting brackets assemblies comprises a pair of mounting brackets. The first board bracket mounting assembly includes a first mounting bracket 22 having a first end 30 and a second end 34, wherein the first end 30 of the mounting bracket includes a first leg 38 and a first foot 42 extending from the first leg and wherein a second end 34 of the mounting bracket includes a second leg 46. The first leg 38 is shorter than the second leg 46, and the second leg 46 includes a slot 50 disposed therethrough. A support hole is disposed in the first foot 42 and an adjustable support 25 extends through the support hole.

The first board bracket mounting assembly 20 further includes a second mounting bracket 28 having a first end 54 and a second end 58, the second end 58 including a first mounting foot 62 extending therefrom, and a mounting hole disposed in the first mounting foot 62. The second mounting bracket 28 includes a slot 66 disposed therethrough and wherein at least a portion of the slot 66 of the second mounting bracket is positioned overlapping at least a portion of the slot 50 of the second leg of the first mounting bracket. A first fastener is disposed through the slot 50 of the first mounting bracket 22 and through the slot 66 of the second mounting bracket 28 such that the second end of the first mounting bracket is positionable along a length of the second mounting bracket and wherein the first fastener is used to fixate the first mounting bracket in a desired position along the second mounting bracket.

A second one of the board bracket mounting comprises a third mounting bracket 24 having a first end 32 and a second end 36; wherein the first end 32 of the mounting bracket includes a first leg 40 and a first foot 44 extending from the first leg and wherein a second end 36 of the mounting bracket includes a second leg 48. The first leg 40 is shorter than the second leg 48, and the second leg 48 includes a slot 52 disposed therethrough. A support hole is disposed in the first foot 44, and an adjustable support 26 extends through the support hole.

The second board mounting bracket assembly also includes a fourth mounting bracket 30 having a first end 56 and a second end 60, the second end 60 including a first mounting foot 64 extending therefrom, and a mounting hole disposed in the first mounting foot 64. The fourth mounting bracket 30 includes a slot 68 disposed therethrough and wherein at least a portion of the slot 68 of the fourth mounting bracket is positioned overlapping at least a portion of the slot 52 of the second leg of the third mounting bracket. A second fastener is disposed through the slot 52 of the third mounting bracket 24 and the slot 68 of the fourth mounting bracket 30 such that the second end of the third mounting bracket is positionable along a length of the fourth mounting bracket and wherein the second fastener is used to fixate the third mounting bracket in a desired position along the fourth mounting bracket.

The central portion of the board mounting brackets includes a plurality of hanger holes 53 along its length. These hanger holes correspond in size to the holes on the hanger 94. Screws, bolts or other fasteners are positioned in the holes to attach the hanger 94 to the mounting bracket 22 and 24. The plurality of holes allows the hanger 94 to be positioned at different heights relative to the mounting brackets 22 and 24.

Figure 3:
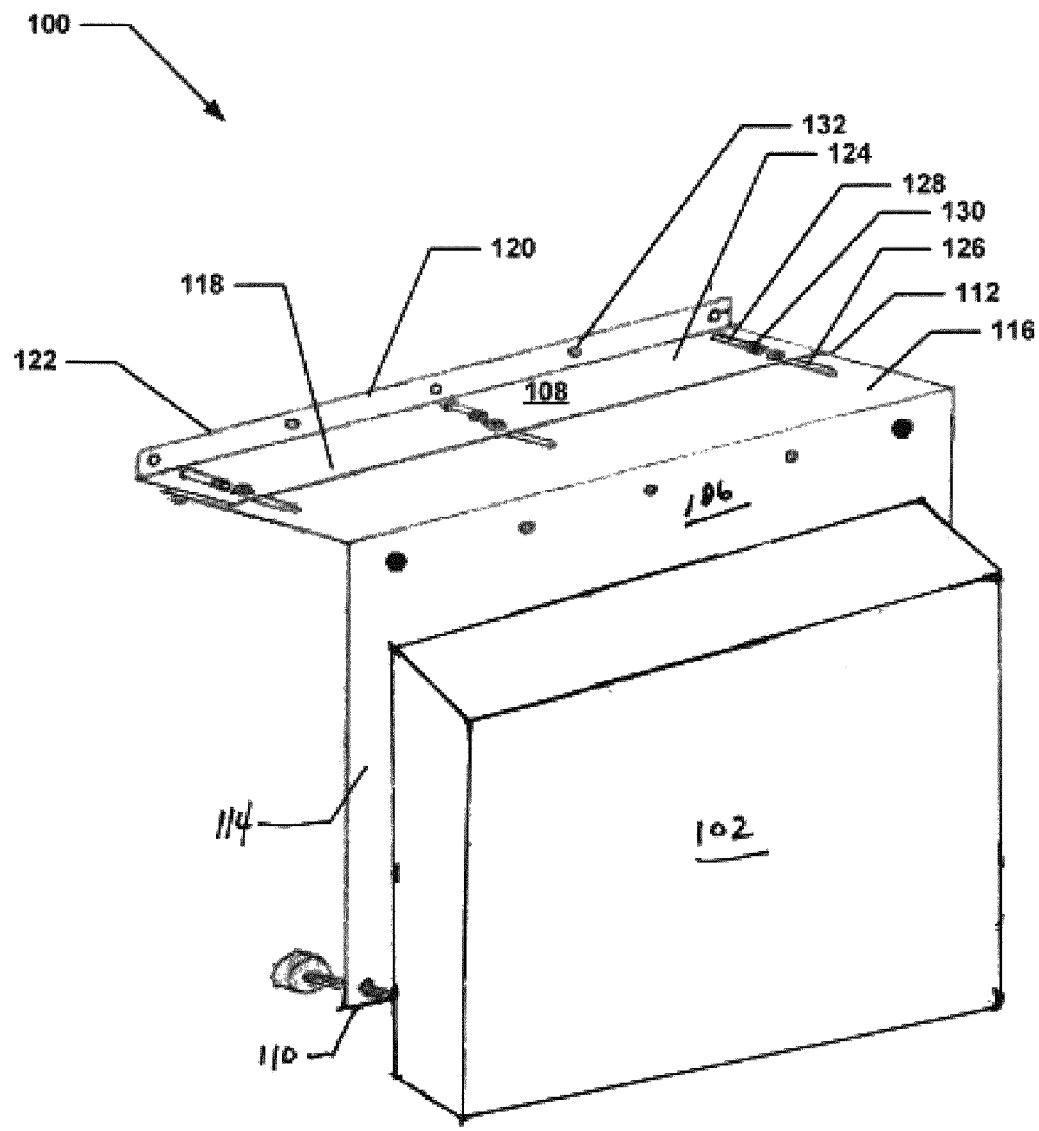
FIG. 3 depicts the short throw projector mounting system with a projector installed.

Referring now to FIG. 3, the projector mount system 100 is shown having a projector 102 mounted thereto. The projector mount system 100 a first surface 106 having a first distal end 110 located on a first portion 112. The first surface 106 further includes a first proximal end 114 located on a second portion 116 of the first surface 106, the first portion of the first surface oriented substantially perpendicular to the second portion of the first surface.

The projector mount system 100 also includes a second surface 108 having a second distal end 118 located on a first portion 120 thereof. The second surface 108 further includes a second proximal end 122 located on a second portion 124 of the second surface, the first portion 120 of the second surface 108 oriented substantially perpendicular to the second portion 124 of the second surface 108.

A first slot 126 is disposed in the first portion 112 of the first surface 106 and a second slot 128 is disposed in the second portion 124 of the second surface 108. At least one fastener 130 is disposed through the first slot 126 and second slot 128, wherein a current adjustable placement of the fastener 130 with respect to the first slot 126 and the second slot 128 maintains an extent to which the first distal end 110 of the first surface 106 is overlapped by the second proximal end 122 of the second surface 108.

The second portion 116 of the first surface 106 includes at least one projector mounting hole 134 (not shown) and the first portion 120 of the second surface 108 includes at least one wall mounting hole 132.

By way of the described short throw projector mounting system, a short throw projector is maintained the required predetermined distance from an interactive whiteboard, even when the interactive white board is mounted over an existing structure. Further, the short throw projector mounting system is adjustable to account for different distances the interactive white board may be mounted from a wall surface, thus insuring that the short throw projector is able to be adjusted to provide the interactive white board with sharp and focused images.

Figure 4:
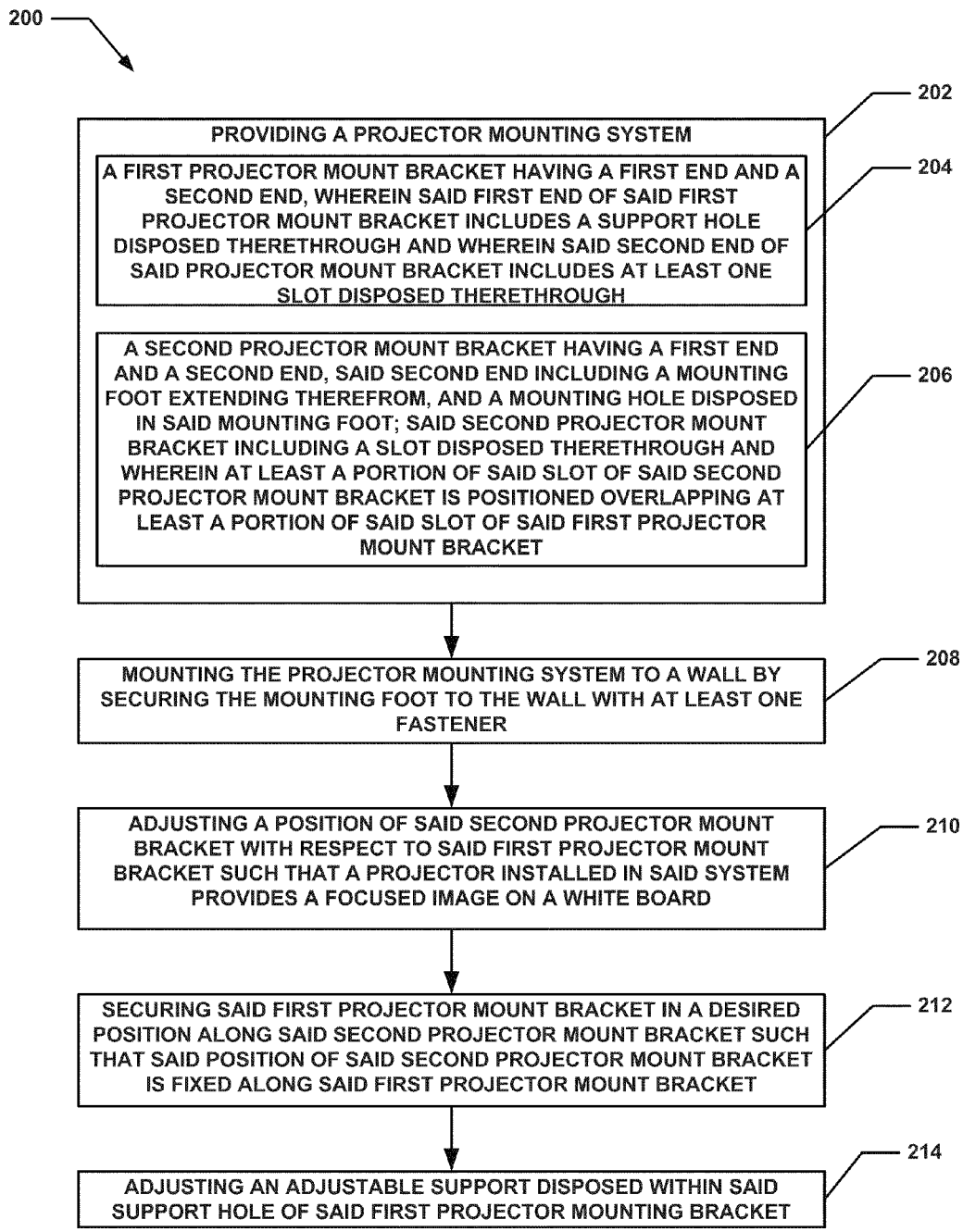
FIG. 4 comprises a flow diagram showing a particular embodiment of a method for installing and operating a short throw projector and interactive white board mounting system in accordance with embodiments of the invention.

A flow chart of the presently disclosed method is depicted in FIG. 4. The rectangular elements are herein denoted "processing blocks". It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4, method 200 begins with processing block 202 which discloses providing a projector mounting system. As shown in processing block 204 the projector mounting system includes a first projector mount bracket having a first end and a second end, wherein the first end of the first projector mount bracket includes a support hole disposed therethrough and wherein the second end of the projector mount bracket includes at least one slot disposed therethrough. As shown in processing block 206, the projector mounting system further includes a second projector mount bracket having a first end and a second end, the second end including a mounting foot extending therefrom, and a mounting hole disposed in the mounting foot; the second projector mount bracket including a slot disposed therethrough and wherein at least a portion of the slot of the second projector mount bracket is positioned overlapping at least a portion of the slot of the first projector mount bracket.

Processing block 208 states mounting the projector mounting system to a wall by securing the mounting foot to the wall with at least one fastener. Processing block 210 recites adjusting a position of the second projector mount bracket with respect to the first projector mount bracket such that a projector installed in the system provides a focused image on a white board.

Processing continues with processing block 212 which discloses securing the first projector mount bracket in a desired position along the second projector mount bracket such that the position of the second projector mount bracket is fixed along the first projector mount bracket. Processing block 214 states adjusting an adjustable support disposed within the support hole of the first projector mounting bracket.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

What is claimed is:

1. A mounting apparatus comprising:

a first projector mount bracket having a first end and a second end, wherein said first end of said first projector mount bracket includes a support hole disposed therethrough and wherein said second end of said projector mount bracket includes at least one slot disposed therethrough;

a second projector mount bracket having a first end and a second end, said second end including a mounting foot extending therefrom, and a mounting hole disposed in said mounting foot; said first end including a slot disposed therethrough and wherein at least a portion of said slot of said second projector mount bracket is positioned overlapping at least a portion of said slot of said first projector mount bracket; and a fastener disposed through said slot of said first projector mount bracket and said slot of said second projector mount bracket such that said second end of said first projector mount bracket is positionable along a length of said second projector mount bracket and wherein said fastener is used to fixate said first projector mount bracket in a desired position along said second projector mount bracket.

2. The mounting apparatus of claim 1 further comprising an adjustable support capable of extending through said support hole of said first projector mounting bracket.

3. The mounting apparatus of claim 2 further comprising a pad disposed on an end of said adjustable support.

4. The mounting apparatus of claim 1 wherein said mounting foot of said second projector mount bracket mounts above a structure.

5. The mounting apparatus of claim 4 wherein said structure is selected from the group consisting of a chalkboard, a whiteboard, a blackboard and a wall opening.

6. The mounting apparatus of claim 1 further comprising a pair of board mounting brackets capable being mounted to a wall and supporting an electronic white board.

7. The mounting apparatus of claim 6 wherein each board mounting bracket comprises:
a first mounting bracket having a first end and a second end, wherein said first end of said first mounting bracket includes a mounting hole disposed therethrough and wherein said second end of said first mounting bracket includes at least one slot disposed therethrough;
a second mounting bracket having a first end and a second end, said second mounting bracket including a support hole disposed in a first end thereof, said second mounting bracket including a slot disposed therethrough and wherein at least a portion of said slot of said second mounting bracket is positioned overlapping at least a portion of said slot of said first mounting bracket; and
a first fastener disposed through said slot of said first mounting bracket and said slot of said second mounting bracket such that said second end of said first mounting bracket is positionable along a length of said second mounting bracket and wherein said first fastener is used to fixate said second mounting bracket in a desired position along said first mounting bracket.

8. The mounting apparatus of claim 7 further comprising an adjustable support capable of extending through the support hole of said second mounting bracket.

9. The mounting apparatus of claim 6 further comprising a hanger in mechanical communication with said board mounting brackets.

10. The mounting apparatus of claim 6 wherein a first end of each of said board mounting brackets mount above a structure.

11. A method comprising:
providing a projector mounting system, said projector mounting system including:
a first projector mount bracket having a first end and a second end, wherein said first end of said first projector mount bracket includes a support hole disposed therethrough and wherein said second end of said projector mount bracket includes at least one slot disposed therethrough; and
a second projector mount bracket having a first end and a second end, said second end including a mounting foot extending therefrom, and a mounting hole disposed in said mounting foot; said second projector mount bracket including a slot disposed therethrough and wherein at least a portion of said slot of said second projector mount bracket is positioned overlapping at least a portion of said slot of said first projector mount bracket; and
mounting said projector mounting system to a wall by securing said mounting foot to said wall with at least one fastener.

12. The method of claim 11 further comprising:
adjusting a position of said second projector mount bracket with respect to said first projector mount bracket such that a projector installed in said system provides a focused image on a white board.

13. The method of claim 12 further comprising securing said first projector mount bracket in a desired position along said second projector mount bracket such that said position of said second projector mount bracket is fixed along said first projector mount bracket.

14. The method of claim 11 further comprising adjusting an adjustable support disposed within said support hole of said first projector mounting bracket.

15. A mounting apparatus comprising:
a first distal end located on a first portion of a first surface;
a first proximal end located on a second portion of the first surface, the first portion of the first surface oriented substantially perpendicular to the second portion of the first surface;
a second distal end located on a first portion of a second surface;
a second proximal end located on a second portion of the second surface, the first portion of the second surface oriented substantially perpendicular to the second portion of the second surface;
a first slot disposed in the first portion of the first surface;
a second slot disposed in the second portion of the second surface;
at least one fastener disposed through the first slot and second slot, wherein a current adjustable placement of the fastener with respect to the first slot and the second slot maintains an extent to which the first distal end of the first surface is overlapped by the second proximal end of the second surface;
wherein the second portion of the first surface includes at least one projector mounting hole; and
wherein the first portion of the second surface includes at least one wall mounting hole.

16. The mounting apparatus of claim 15 further comprising an adjustable support capable of extending through a support hole of said second portion of said first surface.

17. The mounting apparatus of claim 16 further comprising a pad disposed on an end of said adjustable support.

18. The mounting apparatus of claim 15 wherein said first portion of said second surface mounts above a structure.

19. The mounting apparatus of claim 18 wherein said structure is selected from the group consisting of a chalkboard, a whiteboard, a blackboard and a wall opening.

20. The mounting apparatus of claim 15 further comprising:
a pair of board mounting brackets, each board mounting bracket comprising:
a first mounting bracket having a first end and a second end, wherein said first end of said first mounting bracket includes a mounting hole disposed therethrough and wherein said second end of said first mounting bracket includes at least one slot disposed therethrough;
a second mounting bracket having a first end and a second end, said second mounting bracket including a support hole disposed in a first end thereof, said second mounting bracket including a slot disposed therethrough and wherein at least a portion of said slot of said second mounting bracket is positioned overlapping at least a portion of said slot of said first mounting bracket; and a first fastener disposed through said slot of said first mounting bracket and said slot of said second mounting bracket such that said second end of said first mounting bracket is positionable along a length of said second mounting bracket and wherein said first fastener is used to fixate said second mounting bracket in a desired position along said first mounting bracket.

* * * * *